(12) United States Patent
Sellin et al.

(10) Patent No.: US 6,977,916 B1
(45) Date of Patent: Dec. 20, 2005

(54) METHOD OF CONNECTING NETWORK ELEMENTS TO A RADIO SYSTEM, AND RADIO SYSTEM

(75) Inventors: Derek Sellin, Twickenham (GB); Jukka Pietilä, Espoo (FI); Pasi Kivelä, Puuppola (FI)

(73) Assignee: Nokia Corporation, Espoo (FI)

(*) Notice: Subject to any disclaimer, the term of this patent is extended or adjusted under 35 U.S.C. 154(b) by 683 days.

(21) Appl. No.: 09/697,961

(22) Filed: Oct. 27, 2000

Related U.S. Application Data (63) Continuation of application No. PCT/FI99/00351, filed on Apr. 28, 1999.

(30) Foreign Application Priority Data

Apr. 29, 1998 (FI) .................................. 980948

(51) Int. Cl.[7] ............................................ H04B 7/212

(52) U.S. Cl. .................................... 370/347; 370/337

(58) Field of Search ................................ 370/328, 329, 370/330, 336, 337, 347, 341, 431, 442, 468

(56) References Cited

U.S. PATENT DOCUMENTS

| | | | |
|---|---|---|---|
| 5,715,245 A * | 2/1998 | Suonvieri | 370/337 |
| 5,774,790 A * | 6/1998 | Dupuy | 370/337 |
| 5,940,380 A * | 8/1999 | Poon et al. | 370/330 |
| 5,991,282 A * | 11/1999 | Langlet et al. | 370/332 |
| 6,052,369 A * | 4/2000 | Hamalainen et al. | 370/389 |
| H1918 H * | 11/2000 | Hoffpauir et al. | 379/242 |
| 6,266,332 B1 * | 7/2001 | Koivu | 370/336 |

FOREIGN PATENT DOCUMENTS

| | | |
|---|---|---|
| WO | WO 95/01015 | 1/1995 |
| WO | WO 96/14720 | 5/1996 |
| WO | WO 99/22541 | 5/1999 |
| WO | WO 99/35800 | 7/1999 |

OTHER PUBLICATIONS

International Search Report for PCT/FI99/00351.

* cited by examiner

Primary Examiner—Ajit Patel
Assistant Examiner—Chirag Shah
(74) Attorney, Agent, or Firm—Squire, Sanders & Dempsey L.L.P.

(57) ABSTRACT

The invention relates to a radio system and a method of connecting network elements to the radio system comprising one or more network elements, a base station controller and a network management system that are operatively interconnected by means of telecommunication connections. Information between the network elements is transmitted in frames that are divided into time slots. The base station controller controls one or more network elements. Network identification information is fed into a network element to be installed and the network element is physically connected to the system by means of the telecommunication connections. To ensure reliable and quick network element installation in the frames that are used for communication with the network elements by the base station controller, unused consecutive time slots of the frames are divided into one or more groups. Each group has one time slot used as a communication control channel as regards time slot allocation from said group. The base station controller allocates necessary telecommunication capacity for the use of the communication between the network element and the base station controller, and the allocated telecommunication capacity is branched by software through the telecommunication connections to the network elements.

12 Claims, 7 Drawing Sheets

METHOD OF CONNECTING NETWORK ELEMENTS TO A RADIO SYSTEM, AND RADIO SYSTEM

This application is a continuation of international application number PCT/FI99/00351, filed Apr. 28, 1999.

FIELD OF THE INVENTION

The invention relates to a method of connecting network elements to a radio system comprising one or more network elements, a base station controller and a network management system that are operatively interconnected by means of telecommunication connections comprising traffic channels and control channels, and in which system information between the network elements is transmitted in frames that are divided into time slots, and in which system the base station controller controls one or more network elements, and network element identification information has been fed into a network element to be installed, and in which method the network element is physically connected to the system by means of the telecommunication connections.

BACKGROUND OF THE INVENTION

Figure 1:
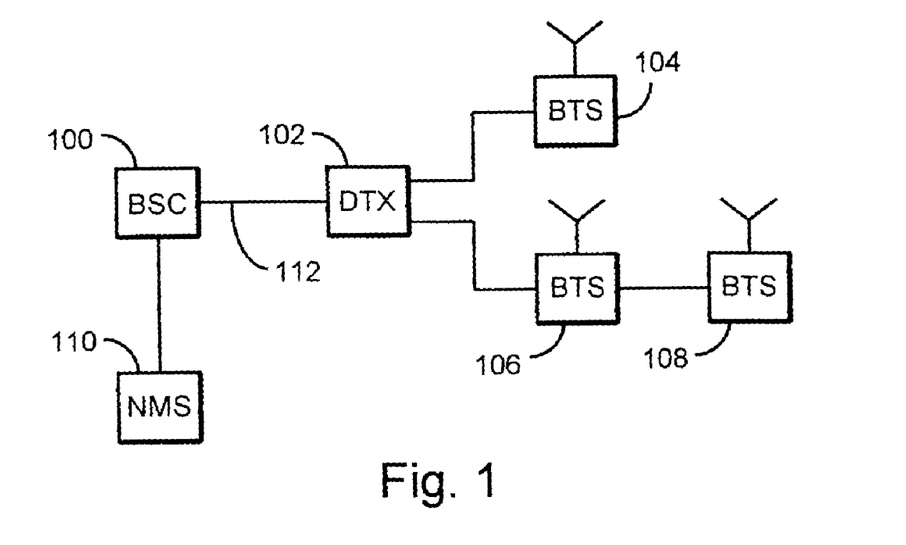
FIG. 1 illustrates an example of a radio system.

Modern radio networks are highly complicated systems comprising several different network components, such as base stations, base station controllers, mobile services switching centres, different transmission networks and cross-connection devices. When networks extend or capacity need increases, to build radio networks and to extend existing networks is a demanding and complex procedure that requires a great deal of planning, time and work. FIG. 1 illustrates an example of a radio system comprising a base station controller 100, cross-connection equipment 102, three base stations 104 to 108 and a network management unit 110. The base station 100 is connected by telecommunication connections 112 to the cross-connection equipment 102 to which, in turn, the base station 104 is directly connected, and to which the base stations 106 to 108 are coupled in series such that information supplied from the base station controller to the base station 108 is transmitted via the base station 106. By means of existing methods, each element is to be manually configured in situ one node at a time according to precalculated parameters and schemes. The management connection has thus to be established manually.

Figure 2:
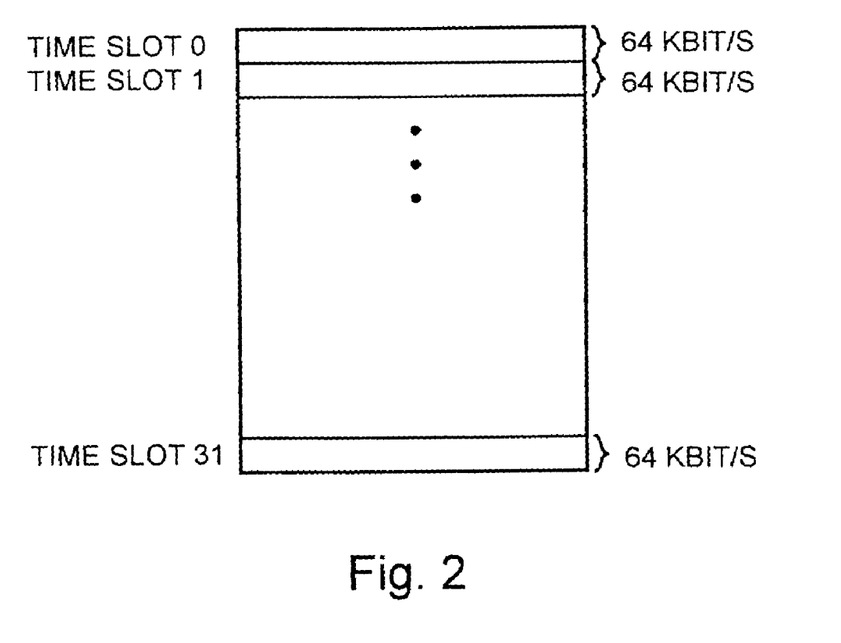
FIG. 2 illustrates an Abis interface.

Typically, in digital systems information between the network elements is transmitted in frames comprising a plurality of time slots. For example in the digital GSM system a connection between a base station and a base station controller is called Abis interface. Typically, the connection is of a frame form and comprises 32 time slots transmitting traffic at a 64 kbit/s transmission rate, the total capacity thus being 2 Mbit/s. FIG. 2 illustrates an Abis interface. Each connection between a base station and a base station controller takes up some time slots from said frame. The number of time slots per a base station varies depending on the size of the base station and the traffic channel capacity.

When network elements, either cross-connection equipment or base stations, are to be added to an existing system, for example similar to the system according to FIG. 1, known remote control methods are no longer feasible. When the equipment is physically installed and connected either to an existing or built telecommunication connection with the system, the telecommunication connections between a base station and a base station controller must in detail be designed and configured at gate, time slot and partial time slot levels. As far as a network element to be installed is concerned, settings must be fixed by installation personnel in order to enable a management connection to the base station controller to be established, whereupon settings for a new base station can also be fixed from the management unit either manually or by software. Hence, to add a new element is a time-consuming and demanding procedure also susceptible to errors. In order to test a new base station and telecommunication connections allocated thereto, the base station installation personnel must communicate with the network management personnel. This requires detailed task coordination between the management unit personnel and the installation personnel so as to avoid unnecessary waiting times.

BRIEF DESCRIPTION OF THE INVENTION

An object of the invention is thus to provide a method and a system implementing the method so as to enable the problems mentioned above to be solved. This is achieved by a method of the type described in the introduction, characterized by in frames used by the base station controller for communication with the network elements, unused consecutive time slots of the frames being divided into one or more groups, and each group having one time slot used as a communication channel as regards time slot allocation from said group, and the base station controller allocating necessary telecommunication capacity for the use of communication between the network element and the base station controller, and the allocated telecommunication capacity being branched by software through the telecommunication connections to the network element.

The method of the invention is further characterized by in frames used by the base station controller for communication with the network elements, unused consecutive time slots of the frames being divided into one or more groups, and each group having one time slot used as a communication channel as regards time slot allocation from said group, and predetermining identification information for the base station controller about network elements allowed to be connected thereto, and after being physically installed, the network element to be installed searching the frames received by means of the telecommunication connections for the communication control channels of the groups and identifying free groups by means of the communication channels found, and the network element transmitting over the communication control channel of the group its identification information and hardware information to the base station controller comparing the identification information with the identification information about the allowed network elements, and when the identification information is allowed, accepting the network element, and the base station controller allocating from the group necessary time slots for the use of communication between the network element and the base station controller and informing the network element of the allocated time slots over the communication control channel, and the allocated time slots being branched by software through the telecommunication connections to the network element.

The invention further relates to a radio system comprising one or more network elements, a base station controller and a network management system that are operatively interconnected by means of telecommunication connections comprising traffic channels and control channels, and in which system information between the network elements is transmitted in frames that are divided into time slots, and in which system the base station controller controls one or more network elements that comprise network element identification information.

The system of the invention is characterized by in frames arranged to be used by the base station controller for communication with the network elements, unused consecutive time slots of the frames being divided into one or more groups, and each group having one time slot used as a communication channel as regards time slot allocation from said group, and predetermining identification information for the base station controller about network elements allowed to be connected to the base station controller, and after being physically installed, the network element to be installed being arranged to search the frames received by means of the telecommunication connections for the communication channels of the groups and to identify free groups by means of the communication channels found, and the network element being arranged to transmit over the communication channel of the group its identification information and hardware information to the base station controller being arranged to compare the identification information with the identification information about the allowed network elements, and when the identification information is allowed, accepting the network element, and the base station controller being arranged to allocate from the group necessary time slots for the use of communication between the network element and the base station controller and to inform the network element of the allocated time slots.

The preferred embodiments of the invention are disclosed in the dependent claims.

The invention is based on the idea that a base station controller controls and monitors the installation of network elements, also being responsible for automatically, without manual couplings and settings, allocating necessary telecommunication capacity for the use of the network elements. The base station and the base station controller communicate with each other by means of control channels, and the necessary telecommunication capacity for the use of the base station is allocated from a group formed by free channels.

The method and system of the invention provide several advantages. Network element installation into the system is automatized. The amount of necessary manual work decreases significantly. Furthermore, time slot design of telecommunication connections between base station controllers and network elements becomes redundant since connections are automatically established, controlled by the base station controller. Automation enables potential errors, and, consequently, costs to be reduced. Further, the invention enables faster installations since installation personnel must no longer be simultaneously present in network control or in connection with base station controllers.

Network element installation requires no special and expensive training since automation also reduces the amount of necessary work on the installation site. When, after the physical installation, a network element is switched on, the network element initiates automatic installation by searching the frames received by means of the telecommunication connections for communication control channels of the groups. After the connections and the appropriate base station controller are found, and the necessary channels having automatically been allocated and branched for the use of the network element, the system can automatically test the connections and inform the installer that the connections are working, in other words that the network element is ready for the operational state.

BRIEF DESCRIPTION OF THE DRAWINGS

The invention is now described in closer detail in connection with the preferred embodiments with reference to the accompanying drawings, in which.

DETAILED DESCRIPTION OF THE INVENTION

The invention will be described in the following mainly using a GSM type cellular radio system as an example without, however, being restricted thereto in any way. It will be obvious to those skilled in the art that the solution of the invention can be applied to any digital data transmission system wherein data transmission connections between the network elements are implemented using a time-divisional frame structure, the system comprising the elements disclosed in the preambles of the independent claims.

Figure 3:
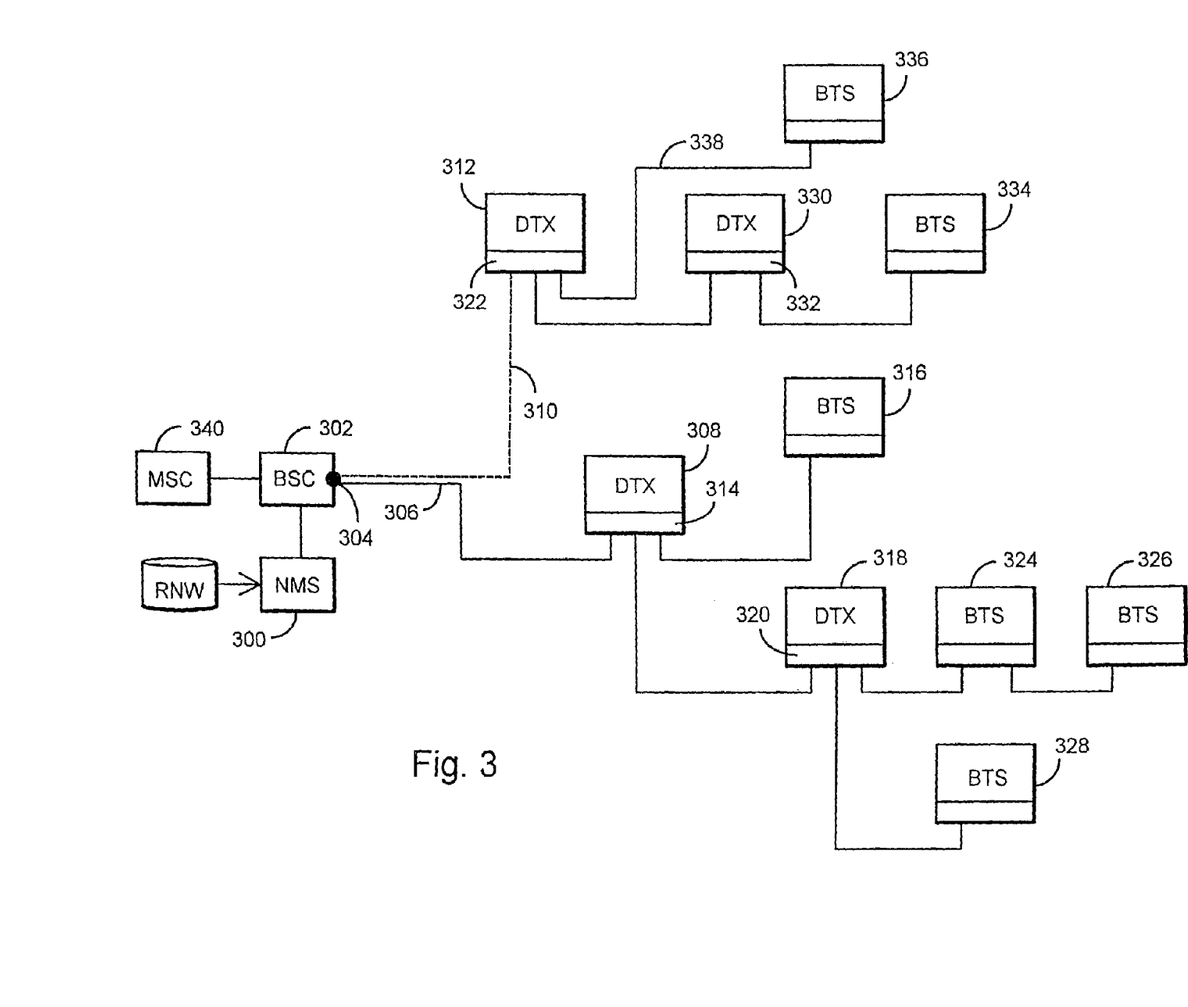
FIG. 3 shows an example of the radio system.

FIG. 3 illustrates an example of a radio system comprising a network management system 300 to enable the operation and operating parameters of the network to be controlled and monitored. The system further comprises a base station controller 302 controlling the operation of base stations located in its area. By means of a gate 314 and a first telecommunication connection 306, first cross-connection equipment 308 is connected to an output gate 304 of the base station controller, and second cross-connection equipment 312 is connected to the output gate 304 of the base station controller by means of a gate 322 and a second telecommunication connection 310. A base station 316 and third cross-connection equipment 318 are connected to the telecommunications gate 314 of the first cross-connection equipment by means of a gate 320. A base station 324 is connected to the gate 320 of the third cross-connection equipment 318, and a base station 326 is coupled in series with the base station 324. A base station 328 is also connected to the gate 320 of the third cross-connection equipment 318. Fourth cross-connection equipment 330 and a base station 336 are connected to the gate 322 of the second cross-connection equipment 312 by means of a gate 332. A base station 334, in turn, is connected to the fourth cross-section equipment gate 332. The system further comprises a mobile services switching centre 340 controlling the operation of the network and transmitting calls to the other parts of the network and to other telecommunication networks, such as a public network. Telecommunication connections between the system devices, such as the connections 306, 310, or 338, can be implemented in ways known to those skilled in the art, for example by means of cabling or micro wave radios.

Figure 5:
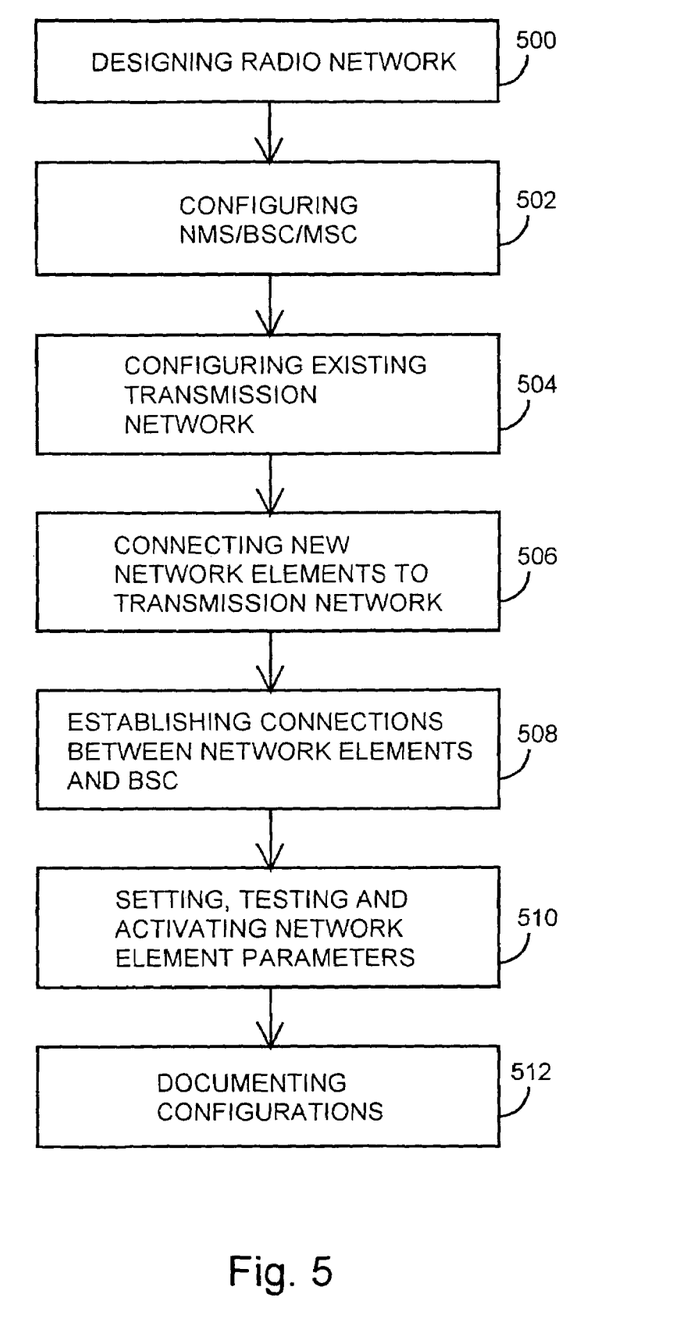
FIG. 5 is a flow diagram illustrating procedures necessary for building or extending the radio system.

By means of a flow diagram shown in FIG. 5, examine next necessary procedures for building or extending the radio system. In the solution of the invention, most network element installation procedures are automatized, but, of course, all procedures cannot be automatized. The disposition and radio channel design of the radio system's base stations 316, 324, 326, 328, 336 and 334 must be performed in advance using the required radio network designing tools. This is executed in step 500 of FIG. 5. In this step, base station locations and each base station's identification information identifying each base station controlled by the base station are determined. Subsequently, it is to be determined how much transmission capacity each base station needs over the telecommunication connections 306, 310 between the base station and the base station controller 302.

Next, the radio system is configured in step 502. The radio system scheme 316 is fed into the network management system 300, which creates network objects for the base station controller, i.e. determines the network elements. At the same time, transmission groups are created; in frames that are used for communication with the network elements by the base station controller, unused consecutive time slots of the frames are divided into one or more groups. These groups can be called transmission groups. The base station controller automatically creates one time slot for each group, the time slot being used as a communication control channel as regards time slot allocation from said group. In this step, free time slots are not allocated for the use of any particular network element.

Concurrently, the mobile services switching centre 340 can be configured for new network elements.

Next, the existing transmission network of the radio system is configured in step 504. Unused-time-slot groups are transmitted as whole groups in the frames and forwarded in the network from the output gate 304 of the base station controller to network elements to which the base stations can be connected, i.e. typically to cross-connection equipment. Assume in this example that in the figure, the time slot groups can be transmitted to the equipment 308 (and to the gate 314 thereof) and the equipment 330 (and to the gate 332 thereof). The transmission can be performed by software, for example by means of the network management system, if the transmission line 306 is suited for the transmission, or manually at the cross-connection equipment. Assume in this example that the transmission line 306 and the first cross-connection equipment 308 support the remote setting performed by software.

Assume further that the second cross-connection equipment 312 is not capable of processing time slots as whole groups in the frames. Such a situation occurs for example when the system is old, comprising old equipment lacking necessary logic and data processing capacity. This equipment and the more intelligent cross-connection equipment immediately behind the equipment must then be processed manually. Hence, in the present example, the connection from the base station controller passes to the gate 332 in the cross-connection equipment 330, and the settings are manually fixed at the cross-connection equipment 330.

The groups are transmitted as a whole from one gate to another, but the absolute group disposition in a frame may vary. This is illustrated by way of example in FIG. 4.

Figure 4:
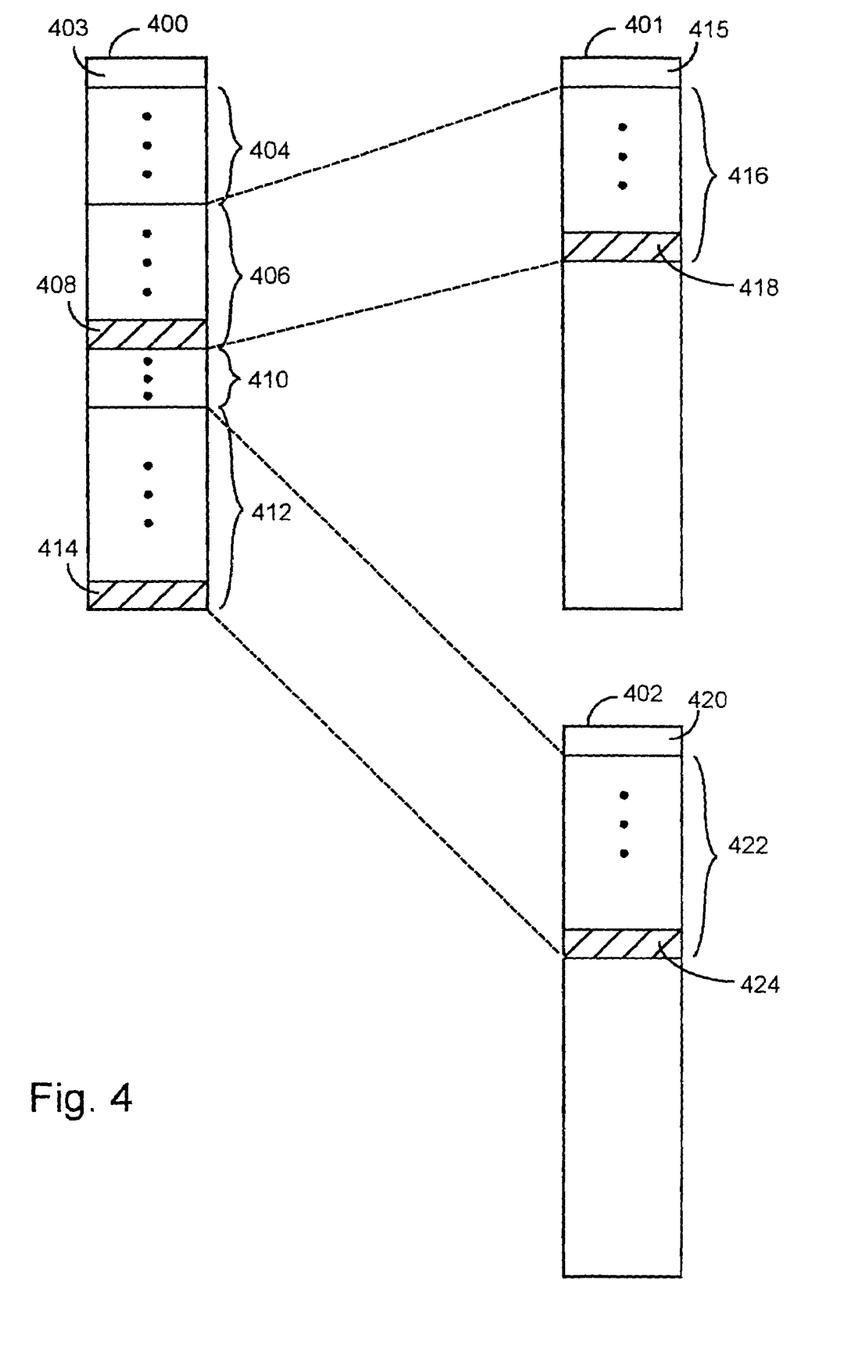
FIG. 4 illustrates an example of an interface between a base station controller and a network element.

FIG. 4 shows a frame 400 in the output gate 304 of the base station controller 304, a frame 401 in the gate 314 of the first cross-connection equipment 308, and a frame 402 in the gate 332 of the fourth cross-connection equipment 330. Each frame thus comprises 32 time slots. The transmission capacity of each time slot is 64 kbit/s. The total transmission capacity of a frame is thus 2 Mbit/s. Assume that a first time slot 403 is used for transmitting link management information. Assume further that next time slots 404 are allocated to another purpose. Next time slots 406 comprise a first group of free time slots. One of the time slots in the group, preferably a last time slot 408, is used as a communication control channel of the group as regards time slot allocation from said group. Next time slots 410 of the frame 400 are, again, allocated for other connections. Next time slots 412 comprise a second group of free time slots. Again, one of the time slots of the group, preferably a last time slot 414, is used as a communication control channel of the group as regards time slot allocation.

The first free-time-slot group 406 is transmitted from the output gate 304 of the base station controller 304 to the gate 314 of the first cross-connection equipment 308. A first time slot 415 of the frame 401 in the gate 314 is used for transmitting link management information. Next time slots 416 comprise the first free-time-slot group. A last time slot 418 of the group serves as the communication control channel. The time slot disposition of the group in the frame can thus vary in different gates.

The second free-time-slot group 412 is transmitted from the output gate 304 of the base station controller 304 to the gate 332 of the fourth cross-connection equipment 330. A first time slot 420 of the frame 402 in the gate 332 is used for transmitting link management information. Next time slots 422 comprise the first free-time-slot group. A last time slot 424 of the group serves as the communication control channel.

It is to be further noted that the free-time-slot group division shown here is only a simplified example. Naturally, in a real situation there can be more groups and they can be transmitted to cross-connection equipment in ways different from the one described above, for example several groups can be transmitted to the same cross-connection equipment.

Next, new network elements are installed in the radio system and connected to the existing transmission network in step 506 of FIG. 5. If a base station to be installed in the system is directly connected to cross-connection equipment not supporting time slot processing in groups, as the cross-connection equipment 312 in the example of FIG. 4 to whose gate 322 the base station 336 is connected, the cross-connection equipment gate must be manually activated in order for the base station 336 to receive a 2 Mbit/s frame over a transmission line 338.

In this step, network elements to be installed are physically connected to the system by means of telecommunication connections. If necessary, the required telecommunication connections must be built. In connection with the physical installation, network element identification information is fed into the network element to identify each base station controlled by the base station controller.

Next, connections are established between the new network elements and the base station controller in step 508 of FIG. 5. In the solution of the invention, connections are established automatically without the network element installer being compelled to perform other procedures than switching on the element installed. In the solution of the invention, after being physically installed, the new network element is arranged to search the frames received by means of the telecommunication connections for group communication control channels and to identify free groups by means of the communication control channels found.

Figure 6:
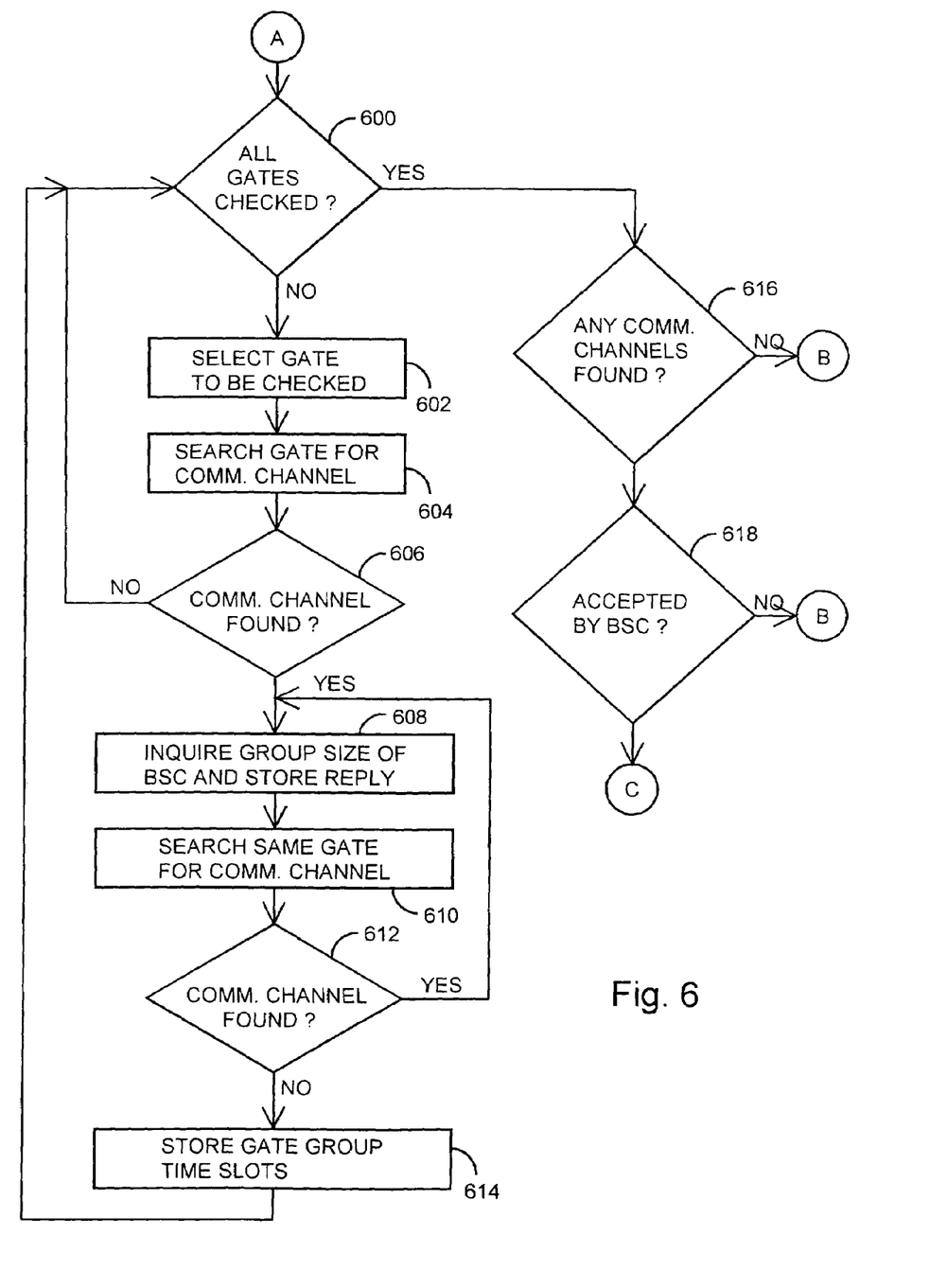
FIG. 6 is a flow diagram illustrating a first example of a search for communication control channels.

Whether a search for communication control channels is performed depends on whether the local network element gate comprises 2 Mbit/s lines themselves comprising freetime-slot groups. Examine first such a case by means of a flow diagram shown in FIG. 6, illustrated by the base station 336 in the figure.

In step 600, it is tested whether all input gates are checked. If not, a gate to be checked is selected in step 602, and the gate is searched for communication control channels in step 604.

In step 606, a decision is made based on the search. If no communication control channels are found in the gate, the process returns to step 600. If a channel is found, the size of the group defined by the communication control channel is inquired of the base station controller in step 608, and the information is stored in the memory.

Next, the same gate is searched for other communication control channels in step 610.

In step 612, a decision is made on the basis of the search. If a channel is found, the process proceeds to step 608. If no further communication control connections are found in the gate, the groups of the gate are stored in the memory in step 614, and the process returns to step 600.

If all gates are checked, the process proceeds from step 600 to step 616, wherein it is checked whether a communication control channel is found. If no communication control channel is found in the gates, the process exits to algorithm B, which will be described below. If a communication control channel is found, in step 618 it is inquired of the base station controller whether it accepts the network element. This is performed by transmitting the network element identification information to the base station controller. If the base station controller does not accept the network element, a connection is established to the next communication control channel, and further to the next one until each communication control channel is thus checked. Then, the process exits to algorithm B. If the base station controller accepts the network element, the network element configuration is continued controlled by the base station controller. This will be described below.

Figure 7:
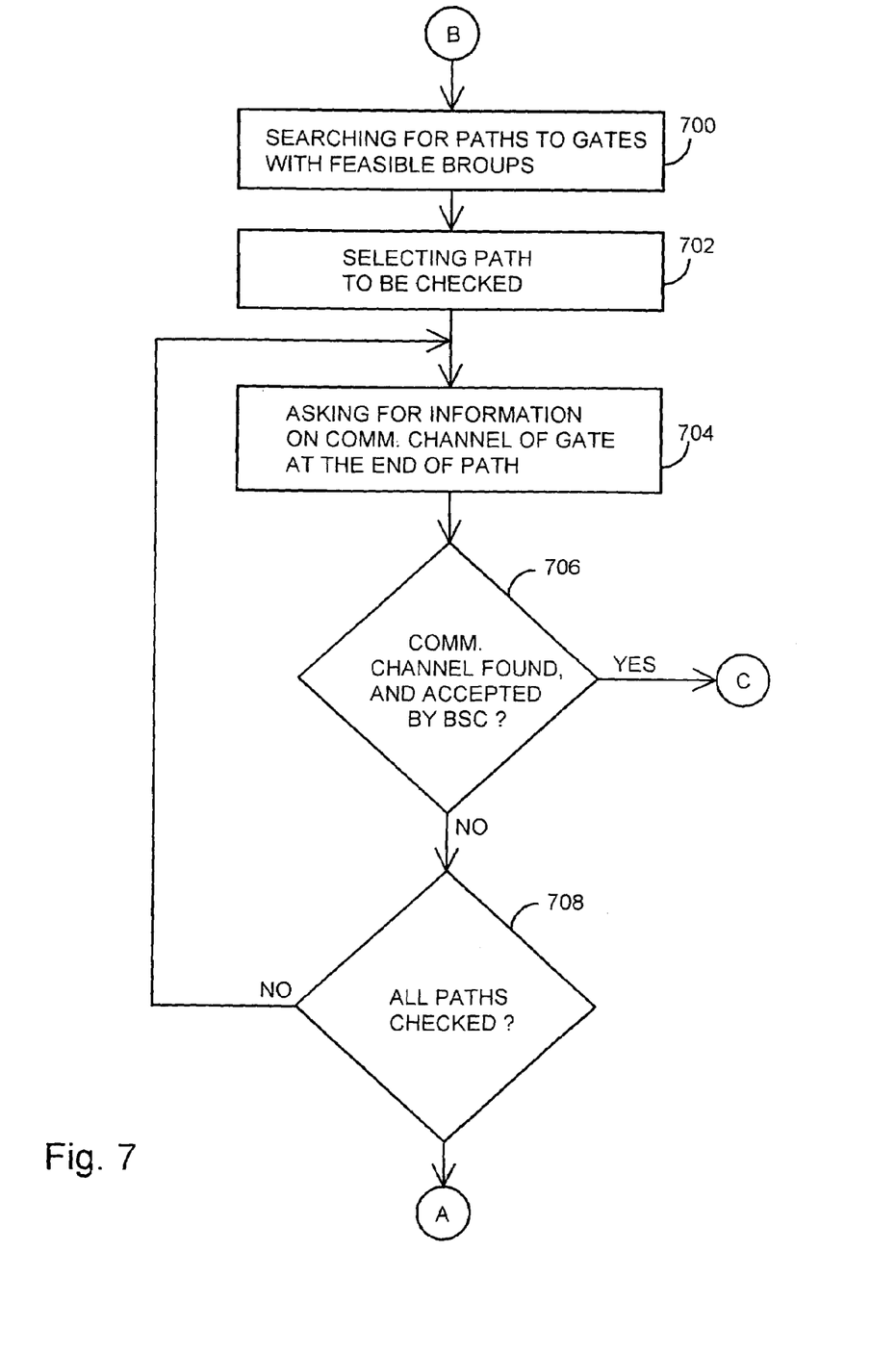
FIG. 7 is a flow diagram illustrating a second example of the search for communication control channels.

Examine next a flow diagram of FIG. 7 illustrating algorithm B, which is executed when no communication control channel or 2 Mbit/s lines themselves comprising free-time-slot groups are found in the local network element gate. In FIG. 3, such base stations are illustrated by the base stations 324, 326, 328 and 334.

In step 700, the network element searches the telecommunication connections for paths to the network elements which comprise unused-time-slot groups as whole groups in the frames.

In step 702, a path to be checked is selected.

In step 704, it is inquired of a corresponding network element whether a communication control channel exists in a gate located at the end of the path to be checked.

The above-mentioned procedure to test whether the base station controller accepts the network element is performed by transmitting network element identification information, hardware configuration parameters and other information to the base station controller. After receiving the above-mentioned information from the network element, the base station controller is arranged to search its data base for the identification information, and if a corresponding identification information is found, the hardware configuration is appropriate, and a necessary number of free time slots is found in the free-time-slot group indicated by the communication control channel, the base station can accept the network element.

If a communication control channel is found and the base station controller using the channel accepts the network element, the process can exit the algorithm, and the network element configuration is continued controlled by the base station controller. This will be described below.

If no communication control channel is found or the base station controller using the channel does not accept the network element, it is checked in step 708 whether all paths are checked; if not, the process proceeds to step 704 to check the next path. If all paths are already checked, the process returns to the beginning of the algorithm for a recheck, since, obviously, the previous check was erroneous.

When a communication control channel is found and the base station controller accepts the network element, connection establishment continues controlled by the base station controller. The base station allocates a necessary number of time slots from the free-time-slot group indicated by the communication control channel for the communication of the network element and the base station controller and transmits information about this to the network element. The time slots are marked as allocated at both ends of the connection and also at cross-connection equipment possibly located on the transmission path.

The connections between the network elements and the base station controller being thus established in step 508 of FIG. 5, the process proceeds to step 510, wherein the network element is configured. The configuration is continued controlled by the base station controller. If necessary, the base station controller downloads software into the network element. The base station controller also downloads necessary radio network parameters into the network element. Next, the base station controller tests the operation of the network element hardware and the allocated time slots.

In step 512, the network element configuration is documented. If the network element passes the tests conducted by the base station controller, the element installer is notified of this. The base station controller informs the network management system of the new network element and the time slots allocated thereto. The network element is now ready to be used.

In an embodiment of the method of the invention, precautions against the events of error can be taken by first connecting the capacity required by the base station as a temporary cross-connection, and after having secured by testing that the connection works, the cross-connections are changed into permanent ones.

It is to be noted here that the procedure described above is only one example of the method of the invention. The order in which some of the above-described functions can be performed may vary.

Figure 8:
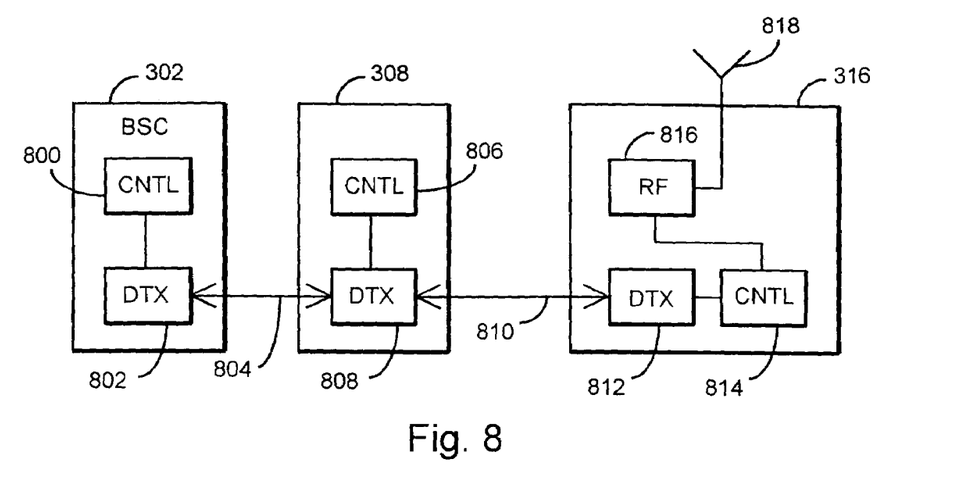
FIG. 8 illustrates an example of the structure of the base station controller, cross-connection equipment and base station of the radio system.

Examples of the structure of the base station controller, cross-connection equipment and base station of the radio system in accordance with the invention are illustrated for the relevant parts in FIG. 8. The base station controller 302 comprises a control unit. The base station controller further comprises transmission equipment 802 by means of which it is connected 804 to the cross-connection equipment 308. The cross-connection equipment 308 typically comprises a control unit 806 and transmission equipment 808 by means of which it is connected 810 to the base station 316. The base station 316 typically comprises transmission equipment 812, a control unit 814, radio frequency parts 816 by means of which a desired signal is transmitted to mobile telephones via an antenna 818. The control units 800, 806 and 814 are typically implemented by means of general processors, signal processors or memory elements.

Procedures required by the method of the invention in the base stations and the base station controller can preferably be performed by software by means of commands stored in control processors. The base station controllers, cross-connection equipment and base stations of the radio system naturally also comprise other components than the ones shown in FIG. 8, as is obvious to those skilled in the art, but being irrelevant to the invention they are not shown in FIG. 8.

Figure 9A:
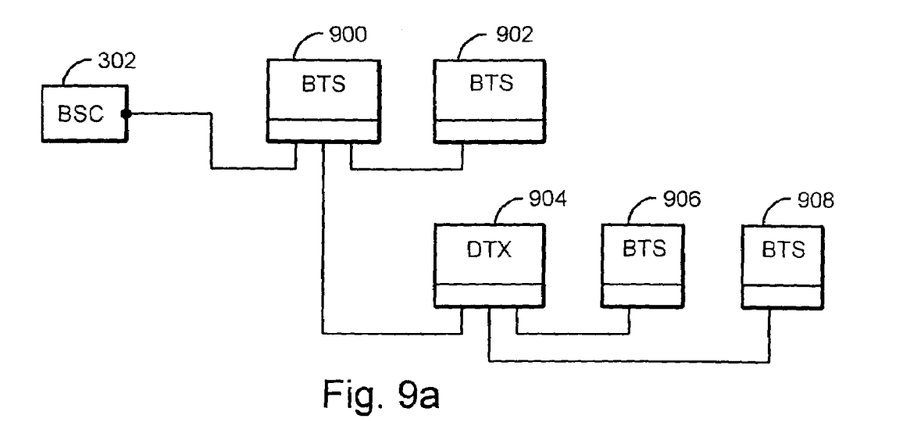
FIGS. 9a and 9b illustrate examples of transmission topologies.
Figure 9B:
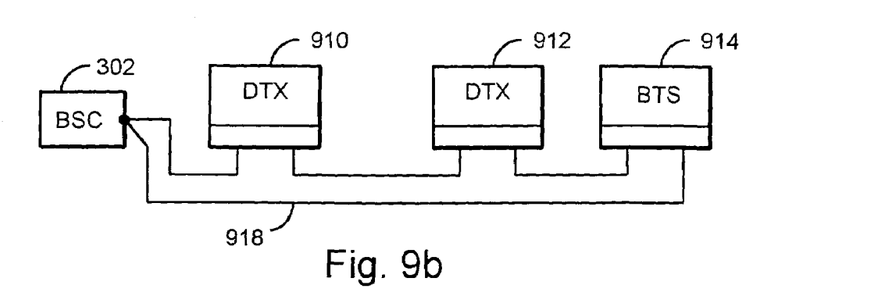

Furthermore, the solution of the invention is not restricted to the transmission topologies shown in FIG. 3, as is obvious to those skilled in the art. FIGS. 9a and 9b illustrate further examples of transmission topologies. In FIG. 9a, the system comprises the base station controller 302 connected to a base station 900, connected, in turn, to a base station 902 and cross-connection equipment 904. The cross-connection equipment 904 is connected to base stations 906 and 908.

In FIG. 9b, the system comprises the base station controller 302 connected to cross-connection equipment 910. The cross-connection equipment 910 is connected to second cross-connection equipment 912, and the second cross-connection equipment 910 is connected to a base station 914. The figure also illustrates a loop connection 918 which enables the maintenance of the connection between the network elements and the base station controller to be secured.

Although the invention has been described above with reference to the examples in accordance with the accompanying drawings, it is obvious that the invention is not restricted thereto but it can be modified in many ways within the scope of the inventive idea disclosed in the attached claims.

What is claimed is:

1. A method of connecting network elements to a radio system comprising one or more network elements, a base station controller and a network management system that are operatively interconnected by means of telecommunication connections comprising traffic channels and control channels, and in which system information between the network elements is transmitted in frames that are divided into time slots, and in which system the base station controller controls one or more network elements, and network element identification information has been fed into a network element to be installed, and in which method the network element is physically connected to the system by means of the telecommunication connections, wherein in frames used by the base station controller for communication with the network elements, unused consecutive time slots of the frames being divided into one or more groups, and each group having one time slot within the group used as a bi-directional communication channel as regards time slot allocation from said group, and predetermining identification information for the base station controller about network elements allowed to be connected thereto, and after being physically installed, the network element to be installed searching the frames received by means of the telecommunication connections for the bi-directional communication control channels of the groups and identifying free groups by means of the bi-directional communication channels found, and the network element transmitting over the bi-directional communication channel of the group its identification information and hardware information to the base station controller wherein the base station controller comparing the identification information with the identification information about the allowed network elements, and when the identification information is allowed, accepting the network element, and the base station controller allocating from the group necessary time slots for the use of communication between the network element and the base station controller and informing the network element of the allocated time slots over the bi-directional communication control channel, and the allocated time slots being branched by software through the telecommunication connections to the network element.

2. A method as claimed in claim 1, wherein the base station controller rejecting the network element if its identification information does not exist among the identification information on the allowed network elements.

3. A method as claimed in claim 2, wherein the network element selecting another base station controller group bi-directional communication channel when the base station controller rejects the network element, and the network element transmitting its identification information and hardware information over the bi-directional communication channel to another base station controller, and the network element repeating this procedure until a base station controller accepts the network element.

4. A method as claimed in claim 1, wherein some network elements of the radio system being interconnected coupled in series by means of the telecommunication connections.

5. A method as claimed in claim 4, wherein the unused-time-slot groups being transmitted by software as whole groups in the frames to network elements that are connected to the base station controllers by telecommunication connections capable of the transmission.

6. A method as claimed in claim 4, wherein information on the unused-time-slot groups being manually set into network elements that are connected to the base station controllers by telecommunication connections incapable of transmission by software.

7. A method as claimed in claim 1, wherein the network element to be installed, after searching the frames received by means of the telecommunication connections for the bi-directional communication control channels of the groups, searching the telecommunication connections for routes to the network elements which comprise unused-time-slot groups as whole groups in the frames.

8. A method as claimed in claim 1, wherein the network elements being the base stations of the system.

9. A method as claimed in claim 1, wherein the communication control channel of each group being a last time slot in the group.

10. A radio system comprising one or more network elements, a base station controller and a network management system that are operatively interconnected by means of telecommunication connections comprising traffic channels and control channels, and in which system information between the network elements is transmitted in frames that are divided into time slots, and in which system the base station controller controls one or more network elements that comprise network element identification information, wherein in frames arranged to be used by the base station controller for communication with the network elements, unused consecutive time slots of the frames being divided into one or more groups, and each group having one time slot within the group used as a bi-directional communication channel as regards time slot allocation from said group, and predetermining identification information for the base station controller about network elements allowed to be connected to the base station controller, and after being physically installed, the network element to be installed being arranged to search the frames received by means of the telecommunication connections for the bi-directional communication channels of the groups and to identify free groups by means of the bi-directional communication channels found, and the network element being arranged to transmit over the bi-directional communication channel of the group its identification information and hardware information to the base station controller wherein the base station controller being arranged to compare the identification information with the identification information about the allowed network elements, and when the identification information is allowed, to accept the network element, and the base station controller being arranged to allocate from the group necessary time slots for the use of communication between the network element and the base station controller and to inform the network element of the allocated time slots.

11. A system as claimed in claim 10, wherein the base station controller being arranged to reject the network element if its identification information does not exist among the identification information about the allowed network elements.

12. A system as claimed in claim 10, wherein the network element being arranged to select another base station controller group bi-directional communication channel when the base station controller rejects the network element, and to transmit its identification information and hardware information to another base station over the channel, and the network element being arranged to repeat this procedure until a base station controller accepts the network element.

* * * * *